United States Patent Office 2,801,701
Patented Aug. 6, 1957

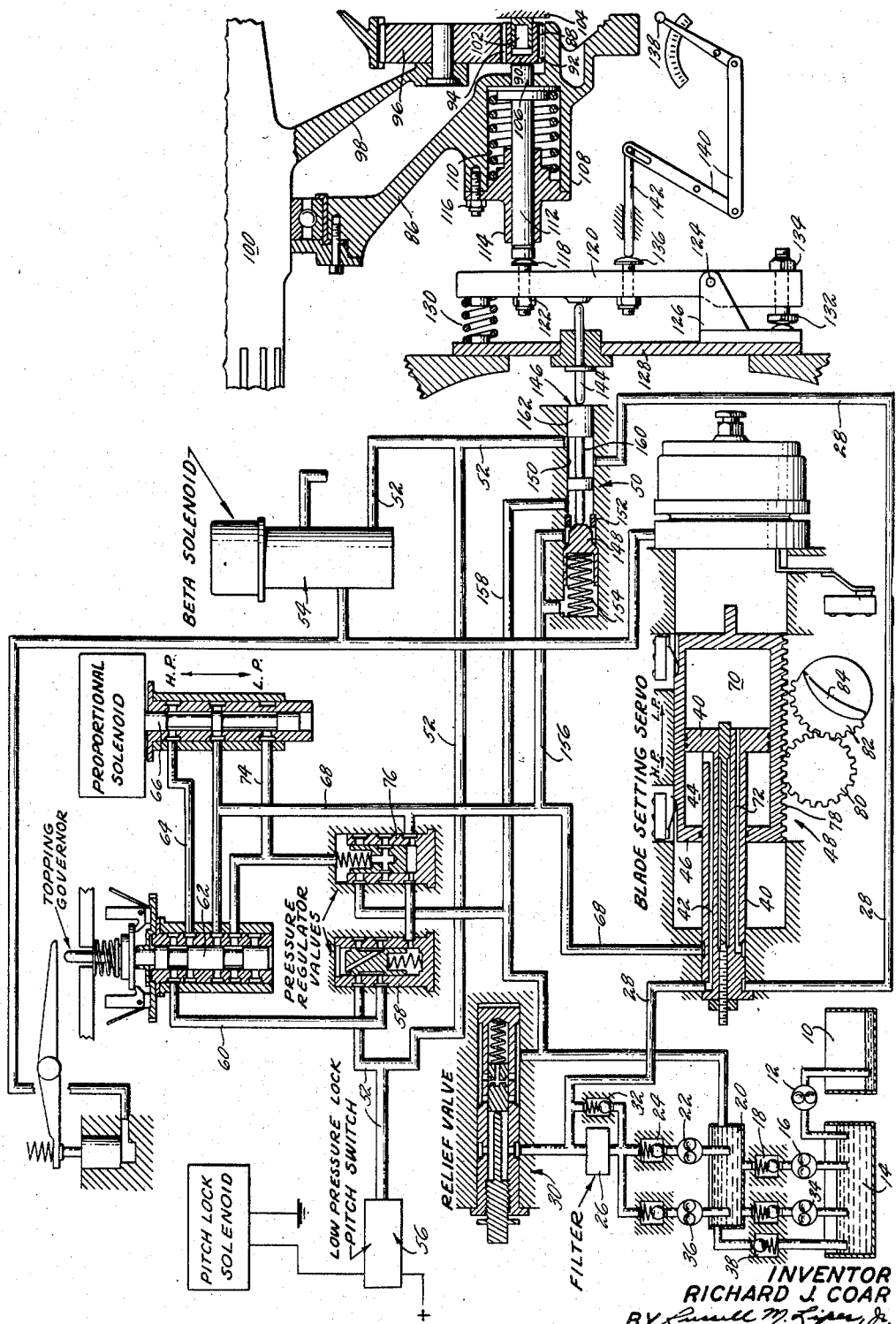

2,801,701

AUTOMATIC FEATHERING CONTROL OF PROPELLER BLADES RESPONSIVE TO NEGATIVE TORQUE

Richard J. Coar, West Hartford, Conn., assignor to United Aircraft Corporation, East Hartford, Conn., a corporation of Delaware Application April 28, 1954, Serial No. 426,060

9 Claims. (Cl. 170—135.72)

This invention relates to automatic feathering control systems for aircraft powerplant propellers, more particularly to an improved control which automatically feathers the propeller upon a negative torque signal from the powerplant.

In the operation of multi-powerplant aircraft where the powerplants are mounted at a distance from the center axis of the aircraft, the problem of faulty operation or failure of one or more powerplants, especially during take-off or landing, is very critical. As the speed of the failing powerplant drops off, the propeller governing control will move the blades of the propeller to progressively lower pitch in attempting to maintain the selected powerplant speed. As powerplant speed continues to decrease, the airstream will tend to windmill the propeller and the drag of the propeller will increase as the pitch of the propeller blades becomes flatter. When the malfunctioning powerplant is located at a relatively large distance from the aircraft axis, asymmetric thrust due to induced drag can cause loss of control and damage to the airframe structure with a possible crash of the aircraft resulting. The problem is particularly critical with turboprop powered aircraft because of the higher unit power output of turboprop powerplants and the higher speeds of aircraft employing such powerplants.

The pilot of an aircraft employing multi-powerplants is fully engaged during take-off or landing with normal operation of the aircraft and it requires a brief interval of time for him to correctly identify a malfunctioning powerplant. His procedure, upon seemingly identifying the malfunctioning powerplant, is to manually operate the feathering button associated with the propeller on that powerplant to feather the propeller blades, thus preventing overspeed and reducing induced drag. It is not unheard of for a pilot to feather the propeller on the wrong powerplant. In any event, the time interval during which the pilot must act and before the propeller is feathered, even though only a few seconds, may be too great to prevent serious consequences.

A control which would automatically sense malfunctioning of an aircraft powerplant and which would initiate feathering action in the propeller governing system is highly desirable. However, various factors must be taken into consideration in developing such a control. For example, the control must be reliable to a degree comparable with any basic function of the aircraft, powerplant and propeller and should not introduce additional mechanism into the power transmission system which could lower the reliability of the powerplant-propeller combination. The control must be fast acting since the time in which windmilling action can cause severe damage to the powerplant or aircraft is extremely short. Further, the control must always be ready to operate in the event of an emergency and to assure the proper operating condition of the control a ground-check prior to takeoff should be possible.

Since the high drags occurring in the event of powerplant failure are concomitant with power transfer from the propeller to the engine, the logical signal for a control which would sense malfunctioning of the powerplant is the negative torque induced in the powerplant reduction gearing. In any negative torque control, however, consideration must be given to the fact that frequently momentary negative torque signals are obtained in the ground-handling power range, during power transients, during air starts, and during aircraft landing approach conditions when negative thrusts are selected. In view of these momentary negative torque signals a negative torque control must be designed so as not to interfere with normal functions of the powerplant-propeller combination and must not commit the powerplant to shutdown upon receiving such a signal. Thus the control should not affect the fuel supply to the powerplant.

Still other factors that must be taken into consideration by a negative torque control include the desirability of making air starts of the powerplant by windmilling the propeller, and the desirability of obtaining a braking effect by reversing propeller pitch upon landing an aircraft. In both cases a negative torque control should permit a limited amount of negative torque input to the powerplant before the propeller blades are feathered.

In the negative torque control of my invention, whenever the propeller attempts to drive the powerplant and thereby produces more than a predetermined negative torque, the powerplant torquemeter gear moves sufficiently to cause the feather rod to actuate the mechanical feather lever on the propeller. This feather lever opens a poppet valve to vent the low pitch side of the blade setting servomotor directly to the sump and then shuts off the control oil supply to the major portion of the propeller governing system including the proportional solenoid. Full oil pressure remains applied in the increase-pitch direction in the servomotor. The action is reversible and, since autofeathering does not shut off the fuel supply to the powerplant, power recovery results in restoration of normal propeller governing.

An object of this invention is to provide a control which automatically senses malfunctioning of the powerplant on a propeller driven aircraft and which immediately initiates feathering of the propeller. Another object of the invention is to provide an effective and dependable means for automatically preventing overspeed and suppressing windmilling drag from an inoperative powerplant prior to feathering the propeller.

Another object is to provide a simple and efficient control for automatically providing at least minimum asymmetric thrust from an inoperative powerplant prior to feathering the propeller. Another object is to provide a negative torque control which will permit a limited amount of negative torque before initiating feathering action so as to accommodate momentary negative torque signals occurring in normal operation and so as to allow air starts of the powerplant to be made. Still another object is to provide a negative torque control which is reversible so that normal powerplant operation can be resumed following power recovery.

Other objects and advantages will be apparent from the specification and claims and from the accompanying drawing which illustrates an embodiment of the invention.

In the drawing:

The single figure is a schematic drawing of the negative torque control applied to the governing system for a hydraulic propeller.

Referring to the drawing in detail, propeller oil is collected in chamber 10 from which it is pumped by scavenge pump 12 to atmospheric sump 14. Oil is pumped from this sump by main pump 16 through check valve 18 to pressurized sump 20 and from here control oil for the propeller governing system is pumped by booster pump 22 through check valve 24 and filter 26 to servo line 28, relief valve 30 maintaining control oil pressure at a predetermined level. If the filter should become clogged, control oil can by-pass the filter through check valve 32. Pumps 16 and 22 comprise the main pump unit and are supplemented by auxiliary pumps 34 and 36, respectively, in case of failure of the drive for the main pump unit, the auxiliary pumps having an independent drive, not shown. Relief valve 38 maintains the required pressure in pressurized sump 20.

Servo line 28 is connected to the left end of fixed piston 40 and control oil in the line passes through passage 42 in the fixed piston to high pitch chamber 44 within cylinder 46, the fixed piston and cylinder being part of servomotor 48 which operates to change the pitch of the propeller blades. The cylinder is arranged to reciprocate over the fixed piston, movement of the cylinder to the left causing the pitch of the propeller blades to increase and movement of the cylinder to the right causing the pitch of the propeller blades to decrease. Servo line 28 continues beyond fixed piston 40 carrying control oil to feather valve 50 and from here the oil normally passes through line 52 to beta solenoid valve 54 which conditions the system for reversing the pitch of the propeller blades, to low pressure lock pitch switch 56 which prevents a decrease of propeller pitch upon loss of control oil pressure, and to pressure regulating valve 58. This latter valve maintains a predetermined pressure of the control oil passing through line 60 to topping governor valve 62 and through line 64 to proportional solenoid valve 66 which selectively controls the flow of pitch-change oil through line 68 to and from low pitch chamber 70 in servomotor 48 on the opposite side of fixed piston 40 from high pitch chamber 44. Line 68 is connected to fixed piston 40 and passage 72 in the fixed piston connects the line and chamber 70.

Fixed piston 40 is exposed over substantially less area to chamber 44 than to chamber 70 and, accordingly, substantially lower pressure of the pitch changing oil in chamber 70 than of the control oil in chamber 44 will effect a pressure balance across fixed piston 40 and hold cylinder 46 motionless. It will be readily understood that reciprocation of the cylinder can be brought about by increasing and decreasing oil pressure within one of the chambers above and below the balancing pressure. As stated above, relief valve 30 maintains control oil pressure constant and, accordingly, the pressure in chamber 44 is constant. Therefore, variation of the pressure of the pitch-change oil in chamber 70 is used to effect movement of cylinder 46 and a change in propeller pitch. Proportional solenoid valve 66 exercises precise speed control of the propeller in maintaining a selected power setting by selectively controlling the flow of oil to and from chamber 70. When valve 66 moves downward oil flows from line 64 through line 68 and passage 72 to chamber 70, and when valve 66 moves upward oil flows from chamber 70 through line 68 to line 74 and pressure regulating valve 76.

The pressure regulating valves 58 and 76 produce a fixed pressure with respect to the balancing pressure in servomotor 48. Valve 58 produces a pressure a fixed amount greater than the balancing pressure and valve 76 produces a pressure a fixed amount lower than the balancing pressure. Thus when proportional solenoid valve 66 connects line 64 to line 68, pitch-change oil at a pressure higher than the balancing pressure is admitted to chamber 70 and cylinder 46 is moved to the right to decrease the pitch of the propeller blades. When valve 66 connects line 68 to line 74, pitch-change oil flows from chamber 70 to pressure regulating valve 76 since valve 76 maintains a pressure in line 74 which is lower than the balancing pressure in chamber 70. Reduction of the pressure in chamber 70 permits cylinder 46 to move to the left and propeller pitch is increased. Whenever cylinder 46 moves due to variation in the pressure of the oil in low pitch chamber 70, rack 78 on the outer surface of the cylinder rotates pinion 80 and gear 82 on the propeller hub to change the pitch of propeller blades 84. The propeller governing system has not been explained in greater detail since the present invention is related primarily to the pitch-change oil in chamber 70, but the system is fully explained in copending application Serial No. 426,061, for Servo Control System for a Variable Pitch, executed by Stanley G. Best on April 23, 1954, filed April 28, 1954 and assigned to applicant's assignee.

Feather valve 50 dumps pitch-change oil in chamber 70 and shuts off the flow of control oil to the propeller governing system upon receiving a negative torque signal from the powerplant. This signal is obtained from the propeller reduction gearing in the nose section of the powerplant. Nose housing 86 is the only powerplant structure shown, the housing having a series of helical splines 88 machined about its inner surface. Torquemeter ring gear 90 has similar helical splines 92 about its outer circumference which engage with splines 88, the splines being cut at an angle to the axis of the gear so that engine driving torque exerted on the gear produces a component thrust to the right. The torquemeter gear has spur gear teeth 94 about its inner circumference which mesh with planet gears 96 on cage 98 connected to propeller shaft 100. To counteract the thrust of torquemeter ring gear 90, a plurality of small pistons 102 are located in holes in the right face of the gear. The heads of the pistons abut against fixed surface 104 which is part of the powerplant structure. Powerplant lubricating oil, whose pressure has been raised by a booster pump, is fed to the inside of piston 102, the flow of oil being controlled in such a way that as torquemeter gear 90 moves to the right oil flow to the pistons increases and as the gear moves to the left oil flow to the pistons is decreased. Thus the torquemeter gear is balanced between the thrust component of the engine torque and the thrust due to oil pressure between the pistons and gear 90. The oil pressure is, therefore, directly proportional to the engine driving torque and by attaching the piston oil supply to a gauge, torque pressure can be read. Torquemeter systems are well known in the art and a system similar to that described here is fully disclosed in U. S. Patent 2,426,879, issued September 2, 1947 to L. S. Hobbs et al. for Radial Aircraft Engine.

In the event of negative torque being developed in the reduction gearing, as when power is transferred from the propeller to the engine, torquemeter gear 90 would tend to move to the left. In the torquemeter system of Patent 2,426,879, this movement would be resisted by powerplant structure. In this invention provision is made for movement of torquemeter gear 90 to the left in response to a negative torque signal. A plurality of plungers, one of which is shown at 106 and which is loaded by compression spring 108, resists movement of torquemeter gear 90 to the left into the negative torque range. The plungers and springs are mounted in chambers spaced about the outer surface of housing 86 in a circle coaxial with gear 90, one of the chambers being shown at 110. In order to provide for temporary negative torque signals during normal operation of the powerplant, to permit air starts, and to permit propeller braking, the initial compression of springs 108 requires a predetermined negative torque value before the spring force is overcome and gear 90 will move to the left. In one installation in which applicant's invention has been use, the propeller negative torque must exceed 3500 lb.-ft. before the torquemeter gear starts to move into the negative torque range.

Whenever the propeller drives the powerplant and produces more than predetermined negative torque, torquemeter gear 90 and plunger 106 move to the left pushing feather rod 112, mounted in one of the chambers 110, to the left. This rod is guided by cap 114 carrying the outside end of chamber 110 and is secured to housing 86 by one or more fasteners 116. Feather rod 112 is in contact with push-pin 118 connected to feather lever 120. Nut 122 provides for adjustment of push-pin 118. The lever and push-pin are part of the propeller structure and leftward movement of feather rod 112 rotates the lever about pivot 124 on bracket 126 which is attached to cover plate 128. Spring 130 mounted between cover plate 128 and lever 120 tends to urge the lever in a clockwise direction as far as stop bolt 132 will permit and prevents a false signal from being given to feather valve 50. Nut 134 is provided for adjusting the position of the stop bolt.

Adjustable push-pin 136 also is mounted on lever 120 and is part of the manual feathering system. This system is completely independent of the negative torque automatic feathering system and permits the pilot to feather the propeller blades at any time he should desire. It also serves as an override of the automatic system and can be used to prevent unfeathering of the propeller when the negative torque signal becomes less than that required to displace feather rod 112 to the left. Manual lever 138 is mounted in the pilot's compartment and is pushed in a counterclockwise direction when manual feathering control is desired. Movement of the lever in this direction will, thru links 140, move rod 142 to the left against push-pin 136 to rotate lever 120 in a counterclockwise direction about pivot 124, the same as a negative torque signal would rotate the lever.

Rotation of lever 120 in a counterclockwise direction either automatically through a negative torque signal or manually by means of lever 138 results in movement of feather plunger 144, shut-off valve 146 and poppet valve 148 to the left. Valves 146 and 148 are mounted in bore 150 of feathering valve 50, poppet valve 148 normally being held against seat 152 by spring 154. The instant that leftward movement is imparted to the shut-off valve and the poppet valve, the latter valve is displaced from seat 152 and pitch-change oil in chamber 70 and line 68 immediately is dumped through line 156, connected to line 68 and bore 150 at the left side of valve seat 152, through the valve seat and line 158 to pressurized sump 20. Groove 160 in shut-off valve 146 normally connects line 28 with line 52 but land 162 on valve 146 throttle line 152 as the valve moves to the left and finally shuts off the flow of control oil to the proportional solenoid. Thus the effect of a feathering signal from lever 120 is to lower the pressure in chamber 70 of blade setting servomotor 48 so that the pressure in chamber 44 will move cylinder 46 in a direction to increase the pitch of the propeller blades, and to shut off the control oil supply to the governing system so that no signal other than a feathering signal is given to the pitch changing mechanism. The feathering action involves positive forces and motions and acts directly on the blade setting servomotor with no intermediate or arming mechanisms to cause malfunctioning. As long as pressure is available in line 28 pitch increase results although full feathering may not result because some propeller rotation must occur to drive pumps 16 and 22 and thus maintain this pressure. Full feather can be obtained by activation of auxiliary pumps 34 and 36.

The action of the auto-feathering system is reversible, and, since the system does not in any way affect the fuel supply to the powerplant power recovery results in restoration of normal propeller governing. Springs 108 and 154 assure rapid return of torquemeter gear 90 and poppet valve 148, respectively, to their normal position when power is regained. In the event, however, either control oil or pitch-change oil pressure is not available, the blade angle becomes locked by the pitch-lock features within the propeller.

It is to be understood that the invention is not limited to the specific embodiment herein illustrated and described but may be used in other ways without departure from its spirit as defined by the following claims.

I claim:

1. For use with an aircraft powerplant driving a variable-pitch propeller through reduction gearing, said propeller having servomotor means for increasing and decreasing the pitch of the blades of said propeller, said reduction gearing having a ring gear slidable along its own rotational axis upon the transfer of torque from said propeller to said powerplant, means for resisting sliding of said gear due to said torque transfer, said means imposing a loading on said gear so that said gear does not slide until torque exceeds said loading, valve means operable in response to sliding of said torque gear, a fluid supply for actuating said servomotor, said valve means being imposed in said fluid supply, said valve means modifying fluid flow to said motor when the torque exceeds a predetermined amount to increase the pitch of said propeller blades.

2. A powerplant for transmitting power to a propeller, said powerplant including gearing for obtaining a speed differential between the powerplant and the propeller, said gearing including a ring gear adapted to reflect torque transmitted between said powerplant and said propeller, said ring gear tending to move substantially longitudinally along its rotational axis in response to transmitted torque, and means loading said gear against movement in response to torque transmitted from said propeller to said powerplant, said propeller including a hydraulic system for adjusting the pitch of the blades of the propeller, a servomotor in said system, means supplying hydraulic fluid at variable pressure to said servomotor to actuate said motor and effect a change of pitch of the propeller blades, a valve in said supplying means, said valve being operatively connected to and controlled by said ring gear, said valve being opened automatically to dump the hydraulic fluid in said supplying means whenever the torque transmitted from said propeller to said powerplant exceeds said spring loading.

3. A powerplant for transmitting power to a propeller, said powerplant including gearing for obtaining a speed differential between the powerplant and the propeller, said gearing including a ring gear adapted to reflect torque transmitted between said powerplant and said propeller, said ring gear tending to move substantially longitudinally along its rotational axis in response to transmitted torque, and means loading said gear against movement in response to torque transmitted from said propeller to said powerplant, said propeller including a hydraulic system for adjusting the pitch of the blades of the propeller, a servomotor in said system, means supplying hydraulic fluid at variable pressure to said servomotor to actuate said motor and effect a change of pitch of the propeller blades, valve means in said supplying means, said valve means being operatively connected to and controlled by said ring gear, said valve means being opened automatically to dump the hydraulic fluid in said supplying means whenever the torque transmitted from said propeller to said powerplant exceeds said spring loading, said valve means also shutting off the flow of hydraulic fluid to said supplying means.

4. A powerplant for transmitting power to a propeller, said powerplant including gearing for obtaining a speed differential between the powerplant and the propeller, said gearing including a ring gear adapted to reflect torque transmitted between said powerplant and said propeller, said ring gear tending to move substantially longitudinally along its rotational axis in response to transmitted torque, and means loading said gear against movement in response to torque transmitted from said propeller to said powerplant, said propeller including a hydraulic system for adjusting the pitch of the blades of the propeller, a servomotor in said system, means supplying hydraulic fluid at variable pressure to said servomotor to actuate said motor and effect a change of pitch of the propeller blades, valve means in said supplying means, said valve means being operatively connected to and controlled by said ring gear, said valve means being opened automatically to dump the hydraulic fluid in said supplying means whenever the torque transmitted from said propeller to said powerplant exceeds said spring loading, said valve means also shutting off the flow of hydraulic fluid to said supplying means, and linkage for manually controlling said valve means independently of said automatic control.

5. A powerplant for transmitting power to a propeller, said powerplant including reduction gearing for obtaining a speed differential between the powerplant and the propeller, said reduction gearing having a ring gear adapted to reflect torque transmitted between said powerplant and said propeller, said ring gear tending to move substantially longitudinally along its rotational axis in response to transmitted torque, and means preloading said gear against movement in response to torque transmitted from said propeller to said powerplant, said propeller including a hydraulic system for adjusting the pitch of the blades of the propeller, a servomotor in said system, said servomotor including two chambers therein, means supplying hydraulic fluid at constant pressure to one of said chambers, means supplying hydraulic fluid at variable pressure to the other of said chambers to actuate said servomotor and effect a change of pitch of the propeller blades, a valve in said variable pressure supplying means, said valve being operatively connected to and controlled by said ring gear, said valve being opened automatically to dump the hydraulic fluid in said variable pressure supplying means and associated chamber whenever the torque transmitted from said propeller to said powerplant exceeds said preloading, and linkage for manually controlling said valve independently of said automatic control.

6. A powerplant for transmitting power to a propeller, said powerplant including reduction gearing for obtaining a speed differential between the powerplant and the propeller, said reduction gearing having a ring gear adapted to reflect torque transmitted between said powerplant and said propeller, said ring gear tending to move substantially longitudinally along its rotational axis in response to transmitted torque, and means preloading said gear against movement in response to torque transmitted from said propeller to said powerplant, said propeller including a hydraulic system for adjusting the pitch of the blades of the propeller, a servomotor in said system, said servomotor including two chambers therein, means supplying hydraulic fluid at constant pressure to one of said chambers, means supplying hydraulic fluid at variable pressure to the other of said chambers to actuate said servomotor and effect a change of pitch of the propeller blades, a valve in said variable pressure supplying means, said valve being operatively connected to and controlled by said ring gear, said valve being opened automatically to dump the hydraulic fluid in said variable pressure supplying means and associated chamber whenever the torque transmitted from said propeller to said powerplant exceeds said preloading, said valve also shutting off the flow of hydraulic fluid to said variable pressure supplying means, and linkage for manually controlling said valve independently of said automatic control.

7. A powerplant for transmitting power to a propeller, said powerplant including reduction gearing for obtaining a speed differential between the powerplant and the propeller, said reduction gearing having a ring gear adapted to reflect torque transmitted between said powerplant and said propeller, said ring gear tending to move substantially longitudinally along its rotational axis in response to transmitted torque, and springs loading said gear against movement in response to torque transmitted from said propeller to said powerplant, said propeller including a hydraulic system for adjusting the pitch of the blades of the propeller, a servomotor in said system, said servomotor including a cylinder and a piston therein defining two chambers within said cylinder, means supplying hydraulic fluid at constant pressure to one of said chambers, means supplying hydraulic fluid at variable pressure to the other of said chambers to actuate said servomotor and effect a change of pitch of the propeller blades, a valve in said variable pressure supplying means, said valve being operatively connected to and controlled by said ring gear, said valve being opened automatically to dump the hydraulic fluid in said variable pressure supplying means and associated chamber whenever the torque transmitted from said propeller to said powerplant exceeds said spring loading, said valve also shutting off the flow of hydraulic fluid to said variable pressure supplying means.

8. A powerplant for transmitting power to a propeller, said powerplant including reduction gearing for obtaining a speed differential between the powerplant and the propeller, said reduction gearing having a ring gear adapted to reflect torque transmitted between said powerplant and said propeller, said ring gear tending to move substantially longitudinally along its rotational axis in response to transmitted torque, and springs loading said gear against movement in response to torque transmitted from said propeller to said powerplant, said propeller including a hydraulic system for adjusting the pitch of the blades of the propeller, a servomotor in said system, said servomotor including a cylinder and a piston therein defining two chambers within said cylinder, means supplying hydraulic fluid at constant pressure to one of said chambers, means supplying hydraulic fluid at variable pressure to the other of said chambers to actuate said servomotor and effect a change of pitch of the propeller blades, a valve in said variable pressure supplying means, said valve being operatively connected to and controlled by said ring gear, said valve being opened automatically to dump the hydraulic fluid in said variable pressure supplying means and associated chamber whenever the torque transmitted from said propeller to said powerplant exceeds said spring loading, said valve also shutting off the flow of hydraulic fluid to said variable pressure supplying means, and linkage for manually controlling said valve independently of said automatic control.

9. A powerplant for transmitting power to a propeller, said powerplant including reduction gearing for obtaining a speed differential between the powerplant and the propeller, said reduction gearing having a ring gear adapted to reflect torque transmitted between said powerplant and said propeller, said ring gear tending to move substantially longitudinally along its rotational axis in response to transmitted torque, and springs loading said gear against movement in response to torque transmitted from said propeller to said powerplant, said propeller including a hydraulic system for adjusting the pitch of the blades of the propeller, a servomotor in said system, said servomotor including a cylinder and a piston therein defining two chambers within said cylinder, means supplying hydraulic fluid at constant pressure to one of said chambers, means supplying hydraulic fluid at variable pressure to the other of said chambers to actuate said servomotor and effect a change of pitch of the propeller blades, a valve in said variable pressure supplying means, said valve being operatively connected to and controlled by said ring gear, said valve being opened automatically to dump the hydraulic fluid in said variable pressure supplying means and associated chamber whenever the torque transmitted from said propeller to said powerplant exceeds said spring loading, said valve also shutting off the flow of hydraulic fluid to said variable pressure supplying means, means for closing said valve as soon as the torque transmitted is less than said spring loading, and linkage for manually controlling said valve independently of said automatic control.

References Cited in the file of this patent
UNITED STATES PATENTS

| | | |
|---|---|---|
| 2,444,363 | Newcomb | June 29, 1948 |
| 2,605,849 | Bordelon | Aug. 5, 1952 |
| 2,643,724 | Sikorsky | June 30, 1953 |